Jan. 18, 1955     A. R. MORE     2,699,671
CHECK WEIGHT ASSEMBLY FOR HARDNESS TESTERS
Original Filed Sept. 26, 1950
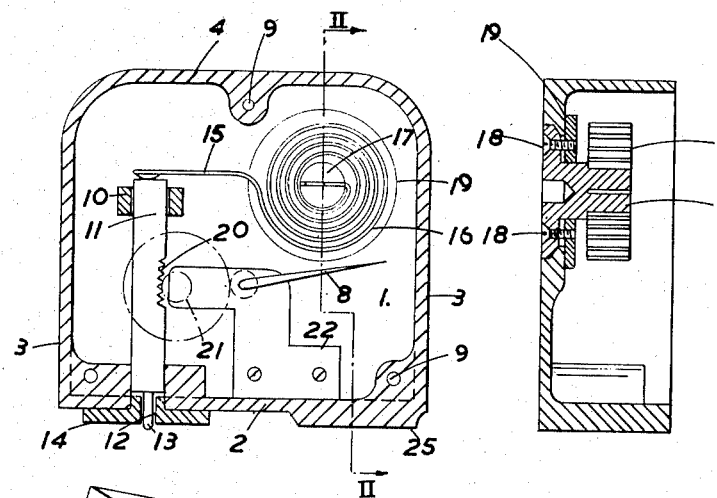
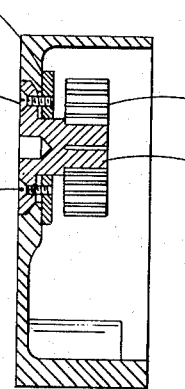
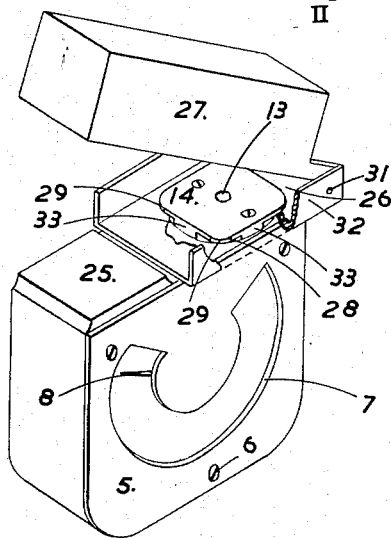
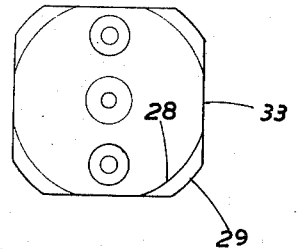
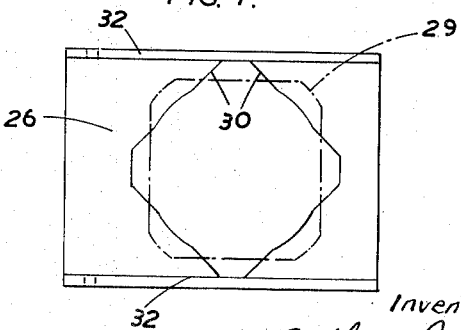
Inventor
Arthur Rowlatt More
By Wilmer Mechlin
Attorney

United States Patent Office 2,699,671
Patented Jan. 18, 1955

2,699,671

CHECK WEIGHT ASSEMBLY FOR HARDNESS TESTERS

Arthur Rowlatt More, Caterham, England, assignor to H. W. Wallace & Company Limited, Croydon, England, a body corporate of Great Britain Original application September 26, 1950, Serial No. 186,704, now Patent No. 2,645,934, dated July 21, 1953. Divided and this application March 25, 1953, Serial No. 344,558

3 Claims. (Cl. 73—1)

This invention relates to apparatus for measuring and indicating or recording the hardness of materials, the said apparatus being of the type employing a spring loaded projecting penetration member operatively connected to an indicator or pointer, the reduction of the extent to which the member projects, furnishing an indication of the hardness of the specimen, e. g. a sheet or block of rubber or the like, and this application is a division from application Serial No. 186,704 and resulting in Patent No. 2,645,934, issued July 21, 1953.

In the aforementioned application Serial No. 186,704 a pocket hardness tester is described comprising in combination a casing having a base, a movable penetration member projecting downwardly through said base, means guiding said penetration member vertically in relation to said casing, a spiral torsion spring in a horizontal axis with freely spaced coils and with one end adjustably anchored in relation to the casing while its other end projects from the coils and resists upward movement of the penetration member, an indicator, and means operatively connecting said indicator with the penetration member to cause said indicator to indicate movements of the penetration member. When using such hardness testing apparatus it is necessary periodically to ascertain whether the spring is correctly adjusted and the pointer is showing correct readings on the scale.

The present invention has for its principal object to provide a check weight for hardness testers for weighing down the penetration members thereof when the testers are inverted with a view to ascertaining whether their springs are correctly adjusted.

A further object is to provide a pivoted mounting arrangement for the checkweight, enabling the latter to be rapidly mounted in operative relation with the hardness tester, and to be rapidly removed after a checking operation.

Further and favourable objects will appear from the following description with reference to the accompanying drawings which show the invention applied to a pocket hardness tester and in which drawings:

Figs. 1 and 2 show the hardness tester according to the aforementioned application Serial No. 186,704, Fig. 1 being a longitudinal vertical section and Fig. 2 a cross section on the line II—II of Fig. 1.

Fig. 3 is a perspective view showing the tester inverted and the pivotal attachment of the check-weight in place while Fig. 4 is a detail view of the bracket providing the removable pivotal attachment for the check weight, and Fig. 5 is a similar view of the foot upon which it is adapted to be secured.

Referring now to the drawings, 1 represents the rear wall of the hollow cast casing which has a base 2, side walls 3, and a top 4, and an open front normally closed by a removable face 5 secured by screws 6 and having an aperture 7 across which is a transparent material wherethrough an indicator needle 8 moving over a suitably calibrated dial may be seen.

The screws 6 engage in tapped holes 9 in bosses cast on the interior of the casing walls, and from the rear wall 1 projects forwardly an upper bearing 10 for a rod or plunger 11 which passes downwardly through an aperture in the base 2 and terminates in a pin 12 having a hemispherical end 13 constituting the penetration member.

14 is a stop member serving to limit the downward movement of the plunger 11 which is urged downwardly by the out-turned end 15 of a clock-type spiral spring 16 mounted within the casing on an adjustable arbor 17, the bottom of such member 14 providing a reference face adapted to rest on the specimen.

Provision is made for adjusting the spring pressure from outside the instrument by winding the arbor 17 with a key after slackening screws 18 which engage in a friction washer 19 concentric with the arbor and which are tightened after the instrument has been properly adjusted.

A portion of the plunger 11 is formed with rack teeth 20 enmeshed with the first pinion 21 of a gear train the final component whereof carries the indicator needle 8, such gear train being carried as a unit in a sub-frame 22 with the axis of the needle 8 located below the middle of the casing so that the needle has an arc of movement of 200°–220° to which the aperture 7 corresponds.

The bottom of the casing is formed with a plinth 25 to provide a support having its bottom surface level with the lower face of the stop member 14 and the latter is adapted for the temporary securement of a bracket 26 forming the pivotal attachment for a check weight 27 when the instrument is being adjusted or zeroised.

For this purpose the instrument is inverted and, as shown in Fig. 3, the stop member 14 has inner and outer stations the first being formed with a part circular periphery comprising four lands 28 between which are intermediate flats 33 and the second having four lips or corner flanges 29 to constitute a retaining plate integral with the member 14.

The bracket 26 has an aperture 30 which can be passed over the outer station of the member 14 with its corner flanges 29 and when the bracket is turned through 45° it is securely positioned radially on the circular periphery 28 and held axially by the four corner flanges 29 as illustrated in Figs. 3 and 4.

The check-weight 27 is pivoted at 31 to channel walls 32 of the bracket 26 and it will be understood that the arbor 17 of the spring is set while the check-weight is bearing on the penetration member 12.

As will be appreciated, the arrangement enables the check weight temporarily to be attached in its correct operative aligned position in relation to the penetration member, with extreme rapidity and ease, while it is instantly removable after the checking operation has been accomplished.

What I claim is:

1. A checking device for a hardness tester including a casing having a base, a movable penetration member projecting through said base, a spring resisting inward movement of the penetration member, an indicator, and means operatively connecting said indicator with the penetration member to cause said indicator to indicate movement of the penetration member; said checking device comprising a check weight for weighing down the projecting portion of the penetration member when the tester is inverted for checking the spring adjustment, and a pivotal mounting member for the check weight adapted to be removably secured to the base in the vicinity of the projecting penetration member and mounting the weight for tilting movement towards and away from the penetration member.

2. A checking device for temporary attachment to a hardness tester having a member on its base having a flat surface and lips on said member; the said device comprising a bracket having an aperture adapted to pass over said member, the edges of the aperture being engaged by the lips when the bracket is turned through 45° temporarily to secure the bracket in position, the bracket being of channel section and having side walls, pivots carried by the channel walls, and a check weight mounted on said pivots for vertical tilting movement towards and away from said member.

3. An arrangement according to claim 2 wherein said member has inner and outer stations the first with a part circular periphery comprising lands with intermediate flats and the second having projecting corner flanges for retaining the bracket.

References Cited in the file of this patent

UNITED STATES PATENTS

| | | |
|---|---|---|
| 1,483,565 | Adams | Feb. 12, 1924 |
| 1,597,668 | Brier | Aug. 31, 1926 |
| 2,324,586 | Klein et al. | July 20, 1943 |